US006232875B1

(12) United States Patent
DeZorzi

(10) Patent No.: US 6,232,875 B1
(45) Date of Patent: May 15, 2001

(54) APPARATUS AND METHOD FOR CONTROLLING A TIRE CONDITION MODULE OF A VEHICLE TIRE

(75) Inventor: Timothy DeZorzi, South Lyon, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/604,554

(22) Filed: Jun. 27, 2000

(51) Int. Cl.[7] .................................................. B60C 23/00
(52) U.S. Cl. .......................... 340/442; 340/438; 340/444; 340/445; 340/447; 73/146.2; 116/34 R
(58) Field of Search .................................. 340/438, 442, 340/444, 445, 447; 73/146.2; 116/34 R

(56) References Cited

U.S. PATENT DOCUMENTS

| | | | |
|---|---|---|---|
| 4,311,985 | 1/1982 | Gee et al. ............................. | 340/447 |
| 4,443,785 | 4/1984 | Speranza .............................. | 340/447 |
| 5,055,826 | 10/1991 | Ballyns ................................ | 340/442 |
| 5,061,917 | 10/1991 | Higgs et al. ......................... | 340/539 |
| 5,285,189 | 2/1994 | Nowicki et al. ..................... | 340/447 |
| 5,335,540 | 8/1994 | Bowler et al. ....................... | 73/146.5 |
| 5,463,374 | 10/1995 | Mendez et al. ...................... | 340/442 |
| 5,500,637 | 3/1996 | Kokubu ............................... | 340/447 |
| 5,559,484 | 9/1996 | Nowicki et al. ..................... | 340/447 |
| 5,600,301 | 2/1997 | Robinson, III ...................... | 340/442 |
| 5,612,671 | 3/1997 | Mendez et al. ...................... | 340/442 |
| 5,717,376 | 2/1998 | Wilson ................................ | 340/442 |
| 5,731,516 | 3/1998 | Handfield et al. ................... | 73/146.5 |
| 5,774,048 | 6/1998 | Achterholt .......................... | 340/447 |
| 5,781,104 | 7/1998 | Huang ................................. | 340/442 |
| 5,783,992 | 7/1998 | Eberwine et al. ................... | 340/445 |

FOREIGN PATENT DOCUMENTS

WO9615919   5/1996   (WO).
WO9700784   1/1997   (WO).

OTHER PUBLICATIONS

U.S. Munch et al. Patent Application entitled Apparatus and Method for Tracking an Abnormal Tire Condition.

*Primary Examiner*—Daryl Pope
(74) *Attorney, Agent, or Firm*—Tarolli, Sundheim, Covell, Tummino & SzaboL.L.P.

(57) ABSTRACT

A tire condition sensor module (14) includes a tire condition sensor (78, 84, 88) operative to sense a tire condition of an associated tire (20) and provide a signal indicative thereof. A motion detector (32) is operative to detect movement of the tire and provide a motion signal indicative thereof. A transmitter (44) transmits a tire transmitter signal indicative of the tire condition signal. A controller (72) is connected with the motion detector (32), the transmitter (44), and the tire condition sensor (78, 84, 88). The controller (72) controls the tire condition sensor (78, 84, 88) to sense the tire condition at a first sensing rate during an initial time period in which the motion signal indicates less than a predetermined amount tire movement. The controller (72) controls the transmitter (44) during the initial time period to transmit the tire transmitter signal depending on the sensed tire condition. The controller (72) controls the tire condition sensor (78, 84, 88) after the initial time period to sense at a second sensing rate, which is less than the first sensing rate, so long as the motion signal continues to indicate less than the predetermined amount of tire movement.

21 Claims, 7 Drawing Sheets

APPARATUS AND METHOD FOR CONTROLLING A TIRE CONDITION MODULE OF A VEHICLE TIRE

TECHNICAL FIELD

The present invention relates to monitoring a condition of a vehicle tire and, more particularly, to an apparatus and method for controlling operation of a tire condition module that monitors a condition of a vehicle tire.

BACKGROUND OF THE INVENTION

Numerous tire pressure monitoring systems have been developed in order to detect when the air pressure within a tire drops below a threshold pressure value. A system typically includes a pressure switch, an internal power source, and a communications link. The pressure switch provides tire pressure information to a central receiver through the communications link. The communications link may be a wired or wireless link.

There has been an increasing need for tire pressure monitoring systems due to the use of "run flat" tires in vehicles. "Run flat" tires enable a driver to travel an extended distance after a substantial loss of air pressure within a vehicle tire.

Examples of tire pressure monitoring systems are disclosed in U.S. Pat. No. 5,285,189, U.S. Pat. No. 4,311,985, and U.S. Pat. No. 5,061,917.

SUMMARY OF THE INVENTION

One aspect of the present invention provides a tire condition sensor module that includes a tire condition sensor operative to sense a tire condition of a vehicle tire and provide a tire condition signal having a characteristic indicative thereof. A motion detector is operative to detect movement of the associated vehicle tire and provide a motion signal having a characteristic indicating movement of the vehicle tire. A transmitter is operative to transmit a tire transmitter signal having a characteristic based on the tire condition signal. A controller is connected with the motion detector, the transmitter, and the tire condition sensor. The controller transitions from a first operating mode to a temporary second operating mode in response to determining from the motion signal a change in tire movement from a first amount of tire movement to an amount that is less than the first amount. When the controller is in the second operating mode, it controls the tire condition sensor to sense tire condition at a rate that is substantially the same rate as when the controller is in the first operating mode. Also, when in the second operating mode, the controller controls the transmitter to transmit the tire transmitter signal in response to determining that the sensed tire condition has a preselected relationship relative to a tire condition threshold.

Another aspect of the present invention provides a tire condition sensor module for a vehicle tire that includes a tire condition sensor operative to sense a tire condition of an associated vehicle tire and provide a tire condition signal having a characteristic indicative thereof. A motion detector is operative to detect movement of the associated vehicle tire and provide a motion signal indicative thereof. A transmitter is operative to transmit a tire transmitter signal having a characteristic based on the tire condition signal. A controller is connected with the motion detector, the transmitter, and the tire condition sensor. The controller operates in a normal mode in response to the motion signal indicating at least a first amount of tire movement. The controller operates in a transition mode for a time period in response to determining from the motion signal a change in tire movement from at least the first amount of tire movement to an amount less than the first amount of tire movement. The controller operates in a sleep mode that occurs after the transition mode so long as the motion signal indicates less than the first amount of tire movement. The controller controls the tire condition sensor and the tire transmitter according to in which mode the controller is operating.

Yet another aspect of the present invention provides a tire condition sensor module for a vehicle tire. The module includes a tire condition sensor operative to sense a tire condition of an associated vehicle tire and provide a tire condition signal having a characteristic indicative thereof. A motion detector is operative to detect movement of the associated vehicle tire and provide a motion signal indicating movement of the associated vehicle tire. A transmitter is operative to transmit a tire transmitter signal having a characteristic based on the tire condition signal. A controller is connected with the motion detector, the transmitter, and the tire condition sensor. The controller transitions from a first operating mode to a temporary second operating mode in response to determining a change in tire movement from a first amount of tire movement to an amount that is less than the first amount. The controller operates in a third operating mode after the second operating mode so long as the motion signal indicates tire movement less than the first amount. When the controller is in the second operating mode, it controls the tire condition sensor to sense tire condition at a rate that is greater than when the controller is in the third operating mode.

Still another aspect of the present invention provides a method of controlling operation of the tire condition module. The method includes the steps of sensing movement of a vehicle tire and providing a signal based on the sensed tire movement. A first mode is operated in while the signal indicates at least a first amount of tire movement. The method changes from the first mode to a second mode in response to the signal indicating that tire movement has changed from at least the first amount to an amount less than the first amount. The second mode is operated in for a predetermined time period provided that the signal indicates less than the first amount of tire movement. The method changes from the second mode to a third mode after the predetermined time period so long as the signal indicates less than the first amount of tire movement. The third mode is operated in so long as the signal indicates less than the first amount of tire movement.

BRIEF DESCRIPTION OF THE DRAWINGS

The foregoing and other features and advantages of the invention will become more apparent to one skilled in the art upon consideration of the following description and the accompanying drawings, in which.

DESCRIPTION OF AN EXEMPLARY EMBODIMENT

Figure 1:
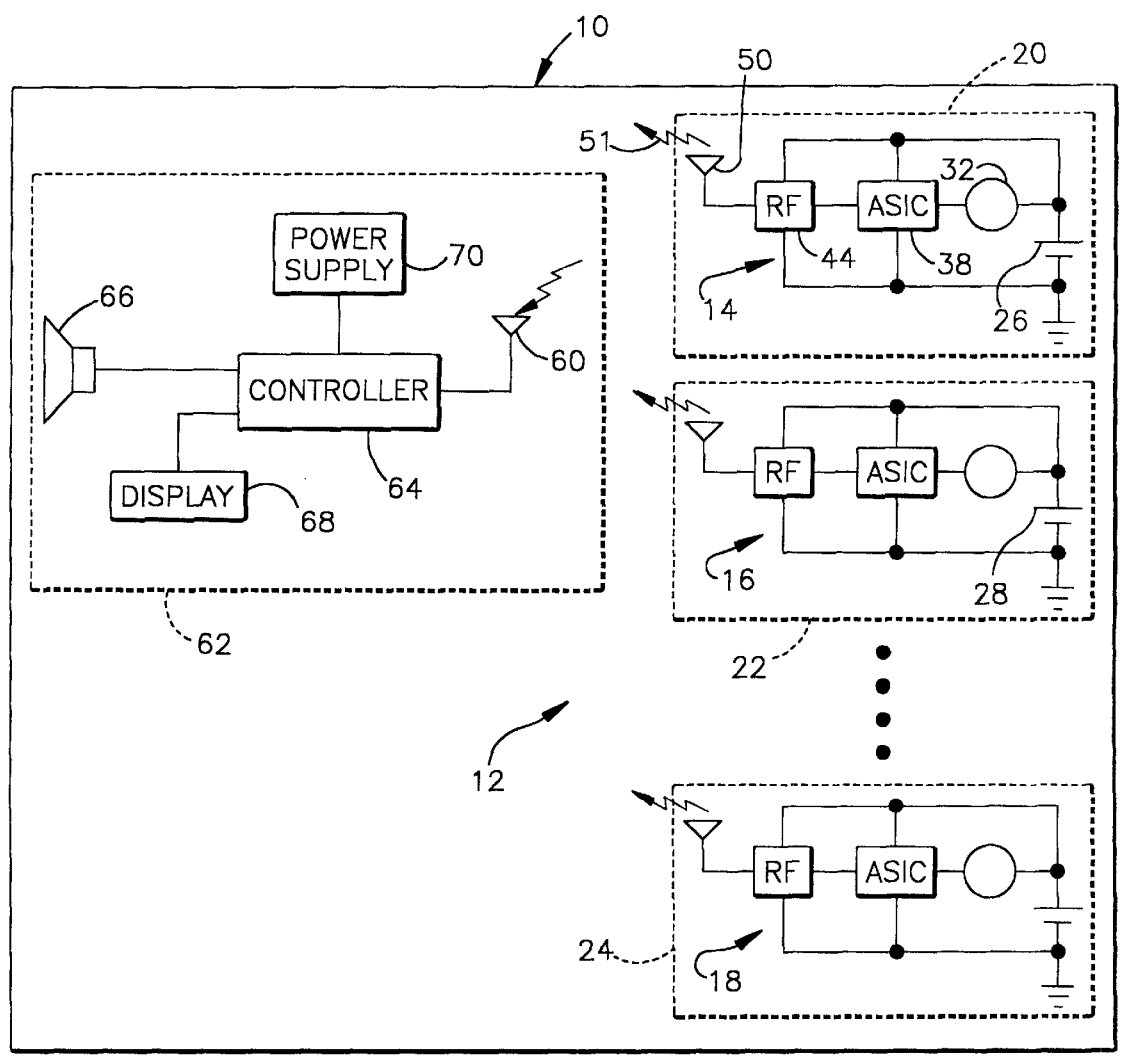
FIG. 1 is a schematic block diagram of a tire condition monitoring system in accordance with the present invention.

FIG. 1 schematically illustrates a vehicle 10 equipped with a tire condition monitoring system 12 in accordance with the present invention. The system 12 includes a plurality of tire condition sensor/transmitter modules 14, 16, and 18 for sensing one or more conditions of associated vehicle tires 20, 22, and 24, respectively. There is one module associated with each vehicle tire, including any spare tire(s) of the vehicle 10. Although these modules 14, 16, and 18 are shown, it is to be understood that each module is similarly constructed. For purposes of brevity, only one module 14 is described in detail.

Module 14 includes an internal power supply 26 that supplies electrical energy to various circuit components of the module 14. In particular, the power supply 26 is electrically connected to a motion detector 32, to a controller such as an application specific integrated circuit (ASIC) 38, and to a radio frequency (RF) transmitter 44. The motion detector 32 provides a motion signal to an ASIC 38 having an electrical characteristic or state that indicates movement of the associated vehicle tire 20. The ASIC 38 has a plurality of operating modes responsive to the motion signal from its associated motion detector 32. The ASIC 38, in turn, controls the operation of its associated module 14 according to its module's current operating mode.

As described in greater detail below, the ASIC 38 includes one or more sensors operative to sense one or more respective conditions of its associated vehicle tire 20 and/or operating parameters of the associated module 14 itself. The sensors provide sensor signals indicative of the condition sensed thereby. The ASIC 38 processes the sensor signals to determine desired tire condition data and/or diagnostic information of the vehicle tire. The ASIC 38 provides tire condition data and/or diagnostic information to its transmitter 44.

The transmitter 44 under the control of the ASIC 38 provides an encoded data message signal to an antenna 50 indicative of the data received from the ASIC. Any type encoding scheme may be used to convey digital data from the tire condition module 14 including, for example, frequency shift keying (FSK), binary phase shift keying (BPSK), pulse width encoding, differential phase shift keying (DPSK), amplitude shift keying (ASK). The antenna 50 transmits or broadcasts the encoded data message as an RF signal through free space, indicated at 51. The data message may, for example, include an indication of tire condition, diagnostic information for the associated module, an identification (ID) code of the module, a tire ID code indicating the location of the module relative to the vehicle, etc.

The RF signal 51 is received at an antenna 60 of a receiver module 62. The receiver module 62 includes a controller 64 and appropriate circuitry and/or software for demodulating and decoding the received signals. The controller 64 itself may include the circuitry that demodulates and decodes the RF signals. Alternatively, such circuitry may be external to the controller 64, such as connected between the antenna 60 and the controller.

Preferably, the controller 64 is a microcontroller or microcomputer configured for receiving the tire condition data signals, demodulating, and decoding the received signals. The controller 64 processes the decoded signals and providing an indication of the received tire condition information. For example, the controller 64 is electrically connected to a speaker 66 for, when appropriate, providing an audible indication, e.g., a warning signal, based on the information contained in the data messages. Alternatively or in addition to the speaker 66, the controller 64 is connected to a display 68 that provides a visual indication of the received tire condition and diagnostic information. The display 68, for example, may be an LED or LCD display of known configuration for displaying detailed tire condition information (e.g., alphanumeric characters) for each vehicle tire as sensed by each of the tire condition modules 14, 16, 18.

The controller 64, the associated display 68, and speaker 66 are powered by a power supply 70. The power supply may be a voltage regulator connected to a vehicle battery, such as when the receiver module 62 is mounted within the vehicle 10. The receiver module 62 alternatively might be powered by an internal power supply. It is also contemplated that the receiver module 62 may be a hand-held, portable device or fob that a vehicle occupant or other individual may carry to obtain an audible and/or visual indication of tire condition and/or diagnostic information.

While, in accordance with one exemplary embodiment of the present invention, the communications link between the module 14 and the receiver 62 has been described as being an RF link, other wireless communication links, such as electromagnetic or optical, could be used in accordance with the present invention.

Figure 2:
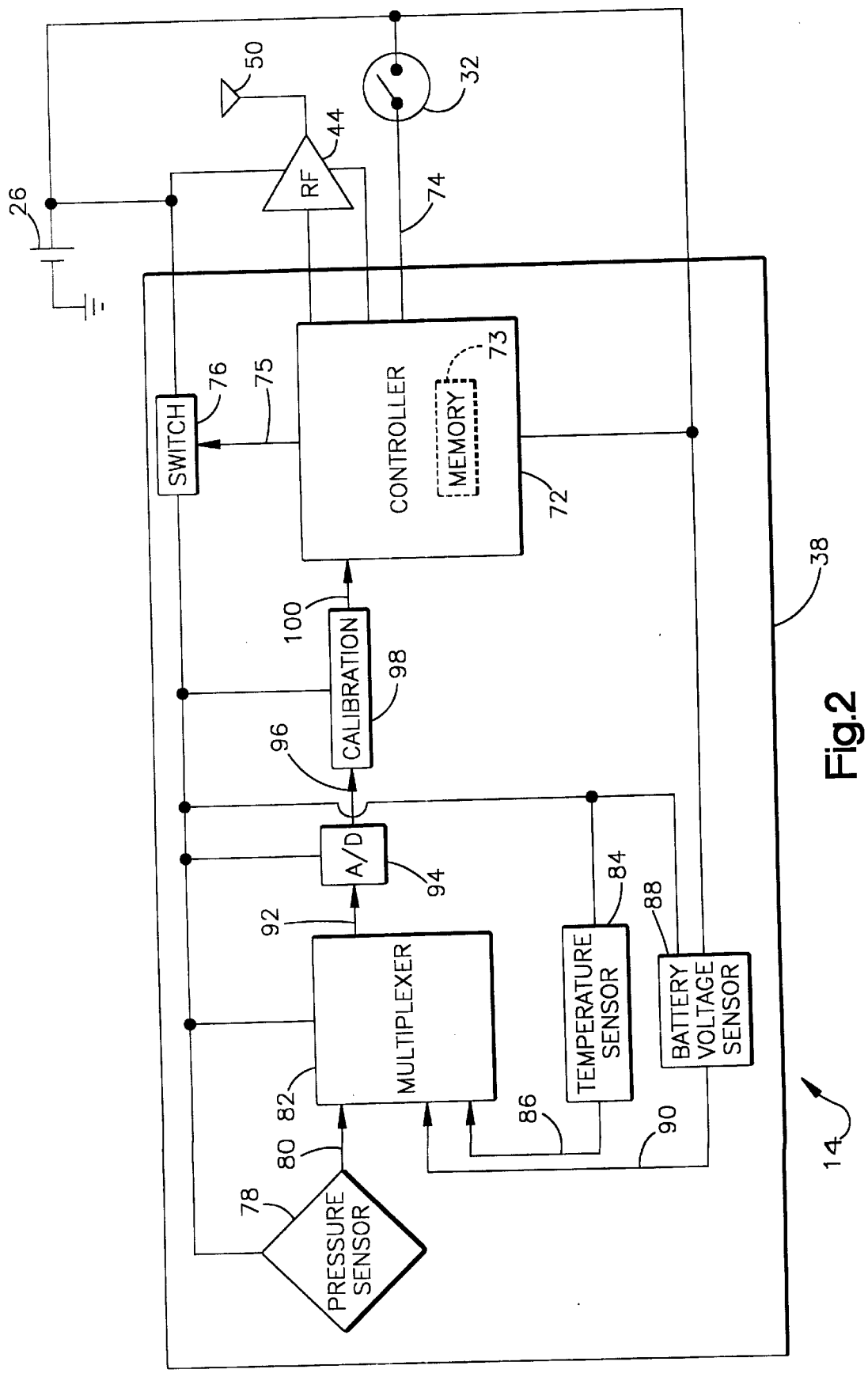
FIG. 2 is a detailed block diagram of a portion of a sensor module of the system of FIG. 1 in accordance with the present invention.

FIG. 2 illustrates a more detailed view of the tire condition sensor module 14 of FIG. 1 in accordance with an exemplary embodiment of the present invention. Identical reference numbers refer to parts of the module 14 previously identified with respect to FIG. 1. The sensor module 14, for example, is integrated in a single package, operating as a stand-alone unit for use with the associated vehicle tire 20 (FIG. 1).

The sensor module 14 (FIG. 2) includes sensor components that are operative to sense various conditions of the vehicle tire and/or to obtain diagnostic information of the module 14. In accordance with an exemplary embodiment of the present invention, the sensed tire conditions include tire pressure and temperature and the diagnostic information includes battery voltage. It is also contemplated that other parameters of the tire and/or of the module also may be monitored in accordance with the present invention. The transmitter 44 of the module 14 broadcasts a data message signal indicative of the sensed parameters, such as in a serial data format, for receipt by the central receiver (e.g., 62 of FIG. 1).

As used herein, including the appended claims, the phrases "tire condition," "tire condition sensor" and related terms and phrases are intended to encompass both sensed conditions (e.g., pressure, temperature) of a vehicle tire and diagnostic information (e.g., battery voltage) of the tire condition module associated with the vehicle tire.

Referring back to FIG. 2, as stated above, the motion detector 32 detects movement of the associated vehicle tire (i.e., 20 of FIG. 1), such as in response to rotation or vibration thereof. Specifically, the motion detector 32 is connected to a controller 72 of the ASIC 38 via connection 74. The motion detector 32 provides a signal to the controller 72 in response to the detected movement.

By way of example, the motion detector 32 is in the form of a normally open centrifugal switch that closes upon the associated vehicle tire 20 rotating at a predetermined rate. The centrifugal switch is closed response to the associated tire rotating at a rate corresponding to at least a predetermined vehicle speed, such as about 10 mph or greater. When the centrifugal switch is closed, it provides a motion signal to the controller 72, such as a logic HIGH signal at a predetermined voltage. The logic HIGH motion signal indicates that the associated vehicle tire (e.g., 20 of FIG. 1) is rotating at a rate corresponding to at least the predetermined vehicle speed. On the other hand, when the centrifugal switch is open, such as for vehicle speeds less than about 10 mph, a logic LOW motion signal is provided to the controller 72 at a predetermined voltage, e.g. zero volts. The logic LOW motion signal indicates either the absence of vehicle movement or movement at a speed less than the predetermined vehicle speed.

The controller 72, for example, may be a microcontroller, a microprocessor, a state machine, discrete components, another ASIC, or any combination thereof. The function of the controller 72 could be implemented as hardware and/or software. The controller 72 controls operation of the module 14.

The controller 72 sets an operating mode or state of the module 14 in response to the motion signal received over 74. The operating mode also may be responsive to other criteria, such as to one or more of the sensed tire conditions. For example, the controller 72 tracks the state of various flag conditions that vary based on monitored parameters, such as pressure, temperature, battery voltage, and motion of the associated vehicle tire. The controller 72 transitions between operating modes according to the particular value of each of the flag conditions. The controller 72 also controls the timing of tire condition measurements and the timing transmission of data messages according to its operating mode.

The controller 72 has an output 75 connected to a control switch 76 for controlling activation of other components of the sensor module 14. In particular, the control switch 76 has an input electrically connected to the power supply 26, such as through an appropriate filter and/or voltage regulator (not shown). The switch 76 also has an output connected to various measuring and processing circuit components located within the ASIC 38. These measuring and processing circuit components could, in accordance with the present invention, be located external to the ASIC 38.

While, for purposes of brevity, a single switch 76 is illustrated as connecting all internal components to the power supply 26, the controller 72 alternatively could control power to each of the components through separate switches or an appropriate switching matrix. Such switches may be located external to the controller 72, such as shown with switch 76 in FIG. 2. Alternatively, one or more such switches could be integrated as part of the controller 72 so as to connect desired electrical energy to selected components.

The ASIC 38 includes a pressure sensor 78 operative to sense tire pressure of the associated vehicle tire (e.g., 20 of FIG. 1). The pressure sensor 78 is connected to the switch 76 and provides a tire pressure signal 80 to an input of a multiplexer circuit 82 indicative of the sensed tire pressure. In particular, the pressure sensor 78 provides the tire pressure signal 80 when activated by the control switch 76. The pressure sensor 78, for example, may be an analog pressure sensing device, such as a Wheatstone bridge. The pressure sensor 78 provides a signal having an electrical characteristic (e.g., a voltage differential) indicating an absolute relative pressure detected by the sensor 78. The pressure sensor 78 is capable of sensing pressure within a range, for example, from about 50 kPa to about 640 kPa over a wide temperature range.

A temperature sensor 84 is connected to the switch 76 and to an input of the multiplexer circuit 82. The temperature sensor 84 provides a signal 86 to the multiplexer circuit 82 having an electrical characteristic indicative of the sensed temperature of the associated vehicle tire. The temperature sensor 84 is shown as part of the ASIC 38. Alternatively, the temperature sensor 84 could be external to the ASIC 38. The controller 72 controls activation of the temperature sensor 84 using the control switch 76.

A battery voltage sensor 88 is electrically connected to the power supply 26 and an input of the multiplexer circuit 82. The voltage sensor 88 monitors the voltage of the power supply 26 when the controller 72 activates the control switch 76. The voltage sensor 88 provides a battery voltage signal 90 to the multiplexer circuit 82 having an electrical characteristic indicative of the sensed voltage of supply 26. The value of the battery voltage signal 90 after each broadcast provides an indication of the electrical energy available from the power supply 26.

The multiplexer circuit 82, thus, receives parallel input signals 80, 86, and 90 from the respective sensing components 78, 84, and 88. The multiplexer circuit 82, in turn, provides a multiplexed serial output signal 92, indicative of the sensed parameters from each of the sensors 78, 84, and 88. The controller 72 also could be connected to the multiplexer circuit 82 to further control the multiplexing function thereof. The multiplexed data signal 92 is provided to an analog-to-digital converter ("A/D") 94. The A/D converter 94 provides a digitized output signal 96 to a calibration function 98. Alternatively, the signals from the sensors 78, 84, and 88 could be digitized prior to being provided to a digital multiplexer circuit in which case the multiplexer circuit would output digital signals indicative of the sensed values.

The calibration function 98, which may be hardware and/or software, is configured to de-multiplex the digitized data signal 96 received from A/D converter 94 and calibrate the data into a readable format for the controller 72. For example, the calibration function 98 may include a plurality of pressure curves, temperature curves and/or look-up tables from which calibrated temperature and pressure values are determined based on the information contained in the digitized data signal 96. The look-up table and curves are derived from empirical data over a wide range of temperature and pressure for the particular pressure and temperature sensors 78 and 84 being used. The calibration function 98 also includes a look-up table for converting the digitized voltage signal into a calibrated voltage value in a useable digital format.

The calibration function 98 provides a calibrated output signal 100 to another input of the controller 72. The signal 100 has a characteristic or value indicative of each of the sensed parameters, e.g., pressure, temperature, and remaining battery energy. The controller 72 receives the calibrated data signal 100 and stores at least some of the received data in appropriate memory 73.

The controller 72 also is programmed with a unique identification (ID) code for the transmitter 44 of the module 14 and, optionally, a tire ID code. The transmitter ID code is set during manufacture. The tire ID code, for example, may be set at the factory or by a technician, using an appropriate data inputting device, who installs the module to indicate the tire location of the module 14 relative to the vehicle, e.g., passenger front, passenger rear, spare tire, etc.

The controller 72 is electrically connected with the RF transmitter 44 for controlling transmissions of the data message through the associated antenna 50. The broadcast of the data message signal occurs at selected times depending on the particular operating mode of the ASIC 38. As mentioned above, the controller 72 determines the operating mode of the ASIC 38 in response to both the motion signal received over connection 74 and/or in response to the sensed parameters indicated by the calibrated output signal 100, i.e., the values of the sensed parameters.

The controller 72 has a first operating mode, hereinafter referred to as the normal operating mode, in response to the motion signal indicating at least a predetermined rate of rotation of the associated vehicle tire, i.e., the centrifugal switch 32 is closed when the vehicle is being driven at a minimum predetermined speed. In the normal operating mode, for example, the controller 72 controls the switch 76 to effect periodic activation of the tire condition sensors 78, 84, and 88 as well as the other circuit components 82, 94, and 98 of the ASIC 38. Accordingly, sensors 78, 84 and 88 periodically sense the tire condition of the associated vehicle tire and system diagnostics at a predetermined rate, such as about once every four to ten seconds.

Also, in the normal operating mode, the controller 72 controls the RF transmitter 44 to broadcast the data message signal. The broadcast of each data message signal, for example, occurs intermittently at random time intervals, such as ranging within a variable time window of about three to about eight minutes. The accuracy of the transmission rates will vary according to the accuracy of the clock located in the controller 72 of the tire condition module 14.

The controller 72 operates in a pre-sleep or transition mode in response to detection of tire rotation dropping below the minimum threshold. This is accomplished by the centrifugal switch 32 indicating a change from a closed condition to an open condition. As indicated above, this occurs when the vehicle tire rotates at a rate corresponding to less than a predetermined vehicle speed, such as less than 10 mph. The pre-sleep mode is maintained for a predetermined duration, such as from about 10–25 minutes. Other lengths of time also could be used.

In the pre-sleep mode, the controller 72 controls the tire condition sensors (e.g., 78, 84, and 88) to sense their respective parameters. In the exemplary embodiment of the present invention, the controller 72 activates the sensors to sense their corresponding parameters at substantially the same rate as when the controller 72 is operating in the normal mode. A different rate also may be used, which may be greater than or less than the sensing rate in the normal mode. However, rather than controlling the transmitter 44 to periodically transmit, as in the normal mode, such transmissions are made in response to the presence of one or more predetermined sensed tire conditions. Recall that "tire conditions" also include module diagnostics as sensed by the sensor 88.

By way of example, when the controller 72 is in the pre-sleep mode, it controls the transmitter 44 to transmit in response to a determination that the sensed tire pressure has a predetermined relationship relative to a pressure threshold. This may include the sensed pressure being less than a low pressure threshold value or the sensed pressure being greater than a high pressure threshold value. Alternatively or in addition, the controller 72 may effect transmission of the data message signal in response to determining a change in pressure. The determined change in tire pressure can be measured between the presently sensed tire pressure and a reference tire pressure value. The reference pressure value can be a stored predetermined pressure value, or a pressure value contained in a previously transmitted data message signal.

After passage of a predetermined time period in the pre-sleep mode, the controller 72 controls the sensor module 14 to enter a third operating mode that is referred to herein as a sleep mode. The controller 72 operates in the sleep mode so long as the signal 74 continues to indicate no tire rotation at a rate greater than the minimum threshold, i.e., the switch 32 remains open because vehicle speed is less than a predetermined value (e.g., 10-mph). The sleep mode only follows after occurrence of the pre-sleep mode.

In the sleep mode, the controller 72 controls the switch 76 to activate each of the tire condition sensors 78, 84, and 88 (the diagnostic sensor) so as to sense their respective parameters at a periodic rate that is substantially slower than the rate at which corresponding tire conditions are sensed when in the normal operating mode or in the pre-sleep mode. The sensing rate in the sleep mode also depends on the accuracy of the clocking function of tire condition module 14. In the sleep mode, for example, the sensors 78, 84, and 88 are controlled to sense the tire conditions from about every ten minutes to about every forty-five minutes.

The tire condition data signal is broadcast in the sleep mode only after one or more of the sensed tire conditions is determined to have a predetermined relationship relative to a corresponding threshold. For example, when in the sleep mode, the controller 72 controls the transmitter 44 to broadcast the tire condition data signal only after first determining that the sensed tire pressure is below a predetermined threshold, such as about 220 kPa or about 18 psi. The broadcast, alternatively, could be in response to determining that the sensed temperature is at or above some predetermined value or that the sensed battery voltage is below a voltage threshold value. Assuming that, for purposes of explanation, the sensed pressure is below the pressure threshold, the controller 72 controls the transmitter 44 to transmit at about the same rate as the pressure is being sensed.

The sleep mode helps to conserve the energy of the internal power supply 26 when the vehicle is parked or otherwise not being used. The sleep mode advantageously still provides for relatively frequent measurements of the tire condition so that upon determining the occurrence of, for example, a low tire pressure condition, this information is provided to the driver upon starting the vehicle as key-on-status information. The restricted broadcasts in the sleep mode further help to reduce interference with other RF communication links of the vehicle, such as a remote keyless entry ("RKE") system. RKE transmissions typically occur when the vehicle is stationary. Other operating modes also could be used to control the frequency of parameter measurements as well as the frequency of transmission of the data message signals.

In view of the foregoing, the operation of the system, in accordance with the present invention, will be better appreciated with reference to FIGS. 3–8. FIGS. 3–8 illustrate an internal operating process for the module 14.

Figure 3:
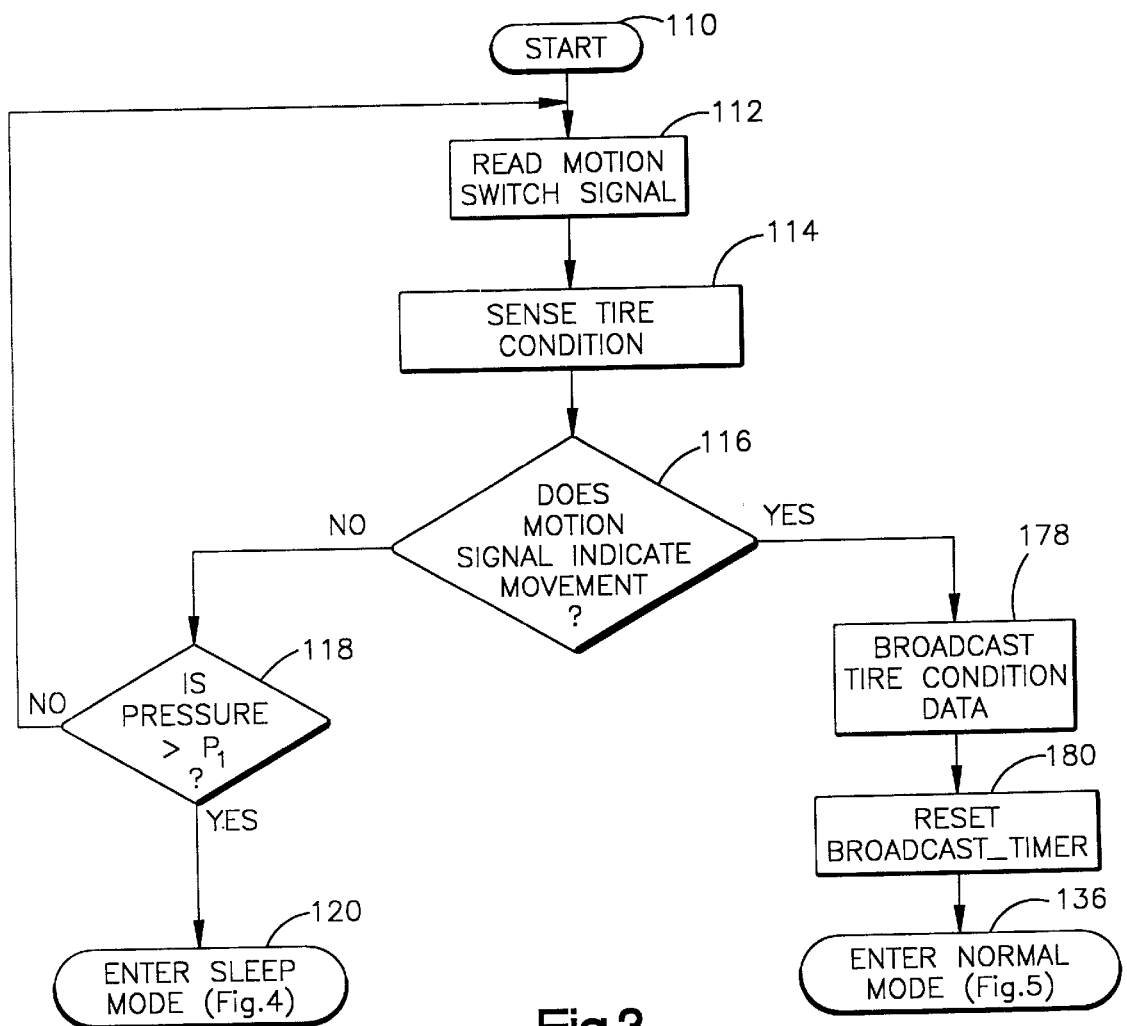
FIG. 3 is a flow diagram illustrating the operation of the sensor module of FIG. 2 in accordance with the present invention.

Referring to FIG. 3, the control process of the module 14 begins at step 110 in which the module 14 is powered up and all registers are cleared, parameters are initialized and flag conditions are set to appropriate starting values. The process proceeds to step 112 in which the motion signal from the motion detector 32 is read.

The process then proceeds to step 114 in which the tire condition is sensed, including tire pressure, temperature, and/or battery voltage. As stated above, this is accomplished by the controller 72 activating the control switch 76 to provide electrical power to the pressure sensor 78, temperature sensor 84, the voltage sensor 88, and other circuit components of the ASIC 38. The sensed tire pressure information is provided as pressure signal 80, the temperature information is provided as temperature signal 86, and the battery voltage information is provided as signal 90. The multiplexer 82 either steps through each of the input signals in sequence responsive to an internal timer or under control of the controller 72.

From step 114, the process proceeds to step 116 in which a determination is made as to whether the motion signal indicates at least a predetermined amount of tire movement. As stated above with respect to FIG. 2, for example, the motion detector 32 is formed of a normally open centrifugal switch that closes in response to the associated vehicle tire rotating at a rate corresponding to a vehicle speed above a predetermined threshold, such as about 10 MPH. When the centrifugal switch 32 is open, thereby indicating that the vehicle is moving at a speed below this predetermined threshold, the process proceeds to step 118.

At step 118, another determination is made as to whether the calibrated representation of the sensed tire pressure (e.g., based on the pressure signal 80) is greater than a predetermined threshold pressure $P_1$. The threshold pressure $P_1$ is selected to provide a nominal pressure value, such as about 220 kPa or about 18-psi, which indicates that the tire sensor module 14 has been exposed to a pressurized environment, i.e., mounted within a pressurized vehicle tire.

If, at step 118, it is determined that the sensed pressure is not greater than the threshold pressure $P_1$, for at least a predetermined time period, the process returns to step 112. This is indicative of a storage mode that is useful for transportation and/or storage of uninstalled modules. The sensor module 14 initially operates in the storage mode in which the module is dormant until one or more sensed conditions results in a transition to a different operating mode.

On the other hand, if the determination at step 118 is affirmative, indicating that the sensed pressure is greater than the pressure threshold $P_1$ for at least the predetermined time period, the process proceeds to step 120. At step 120, the process enters the sleep mode shown in FIG. 4.

Figure 4:
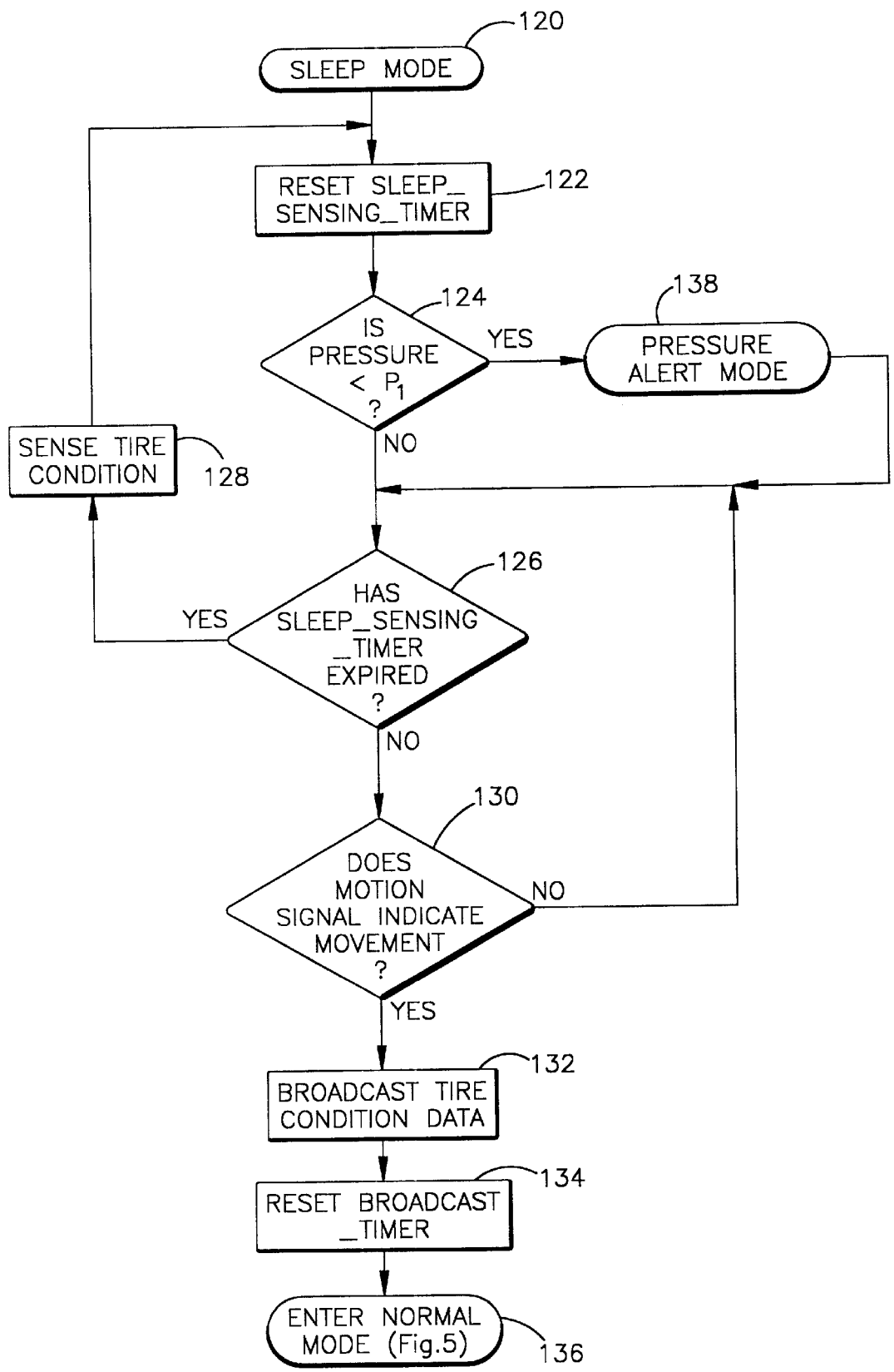
FIG. 4 is a flow diagram illustrating operation of the sensor module of FIG. 2 in a first mode.

Referring to FIG. 4, the process continues from step 120 to step 122 in which a SLEEP_SENSING_TIMER is reset. The SLEEP_SENSING_TIMER provides a time interval, such as about fifteen minutes, for controlling subsequent activation of the tire condition sensors 78, 84, and/or 88 by the controller 72. After the SLEEP_SENSING_TIMER is reset, the process then proceeds to step 124.

At step 124, the controller 72 determines whether the calibrated value of the sensed tire pressure is less than a predetermined threshold pressure. Preferably, this threshold pressure is the same as the threshold pressure $P_1$ of step 118 of FIG. 3, namely about 220 kPa. If it is determined that the calibrated value of the sensed tire pressure is not below the threshold pressure $P_1$, the process proceeds to step 126.

At step 126, a determination is made as to whether the SLEEP_SENSING_TIMER has expired. If it is determined that the SLEEP_SENSING_TIMER timer has expired, the process proceeds to step 128. At step 128, tire condition parameters (including diagnostics) are sensed. In particular, the controller 72 activates the switch 76 to electrically connect the pressure sensor 78 to the power supply 26 so as to obtain a measure of the current tire pressure. The controller 72 also may activate the switch 76 to effect operation of the temperature sensor 84 and/or the battery voltage sensor 88 upon expiration of the SLEEP_SENSING_TIMER. To accomplish this, the switch 76, rather than being a single switch, could include a plurality of switches to separately connect the power supply 26 to the sensors 78, 84, and 88. The controller 72 would individually control the switches. The process then returns to step 122.

If the determination in step 126 is negative, thereby indicating that the SLEEP_SENSING_TIMER has not expired, the process proceeds to step 130. At step 130, another determination is made as to whether the motion signal indicates movement of the associated vehicle tire 20. That is, the controller 72 receives the motion signal via connection 74 and determines whether the motion signal indicates movement of the vehicle at or above a predetermined vehicle speed, such as about 10-mph. In the event that the motion signal does not indicate such vehicle movement in excess of the predetermined threshold, the process returns to step 126 and the controller remains in the sleep mode.

On the other hand, if the determination at step 130 is affirmative, wherein the motion signal indicates that the vehicle is moving at a speed at or above the predetermined vehicle speed, the process proceeds to step 132. At step 132, the controller 72 controls the transmitter 44 to broadcast the tire condition data signal. The tire condition data signal has a characteristic indicative of, for example, calibrated tire pressure information, calibrated temperature information, an indication of the current operating mode, information indicating the condition of the power supply 26, identifying information of the sensor module 14 (e.g., transmitter ID code), as well as error detection information.

The process then proceeds to step 134 in which a BROADCAST_TIMER is reset. The BROADCAST_TIMER defines a time interval, such as a random interval ranging from about 3 to about 7 minutes, which controls the duration between subsequent broadcasts of the tire condition data signal by the transmitter 44 when in the normal operating mode. The process then proceeds to step 136, in which the process enters the normal operating mode of FIG. 5, described below.

Referring back to FIG. 3, if the determination at step 116 is affirmative, thereby indicating movement of the vehicle greater than the predetermined vehicle threshold speed, the process proceeds to step 178. At step 178, selected tire condition data is broadcast. The process then proceeds to step 180 in which the BROADCAST_TIMER is reset. The process then proceeds to step 136 in which the process enters the normal operating mode of FIG. 5.

The broadcasting steps 132 and 178 and the steps of resetting of the BROADCAST_TIMER 134 and 180 are precursors to entering the normal operating mode at step 136, although such steps also could be implemented as part of the normal operating mode. The transition from either the storage mode or the sleep mode into the normal operating mode occurs in response to the controller 72 determining the existence of vehicle movement (i.e., the centrifugal switch is closed) for at least a predetermined time period. This time period ensures that the switch has actually changed from an open condition to a closed condition.

Refer back to step 124 of the sleep mode shown in FIG. 4. If the determination at step 124 is affirmative, thereby indicating that the controller 72 has determined that the calibrated, sensed tire pressure is less than the pressure threshold $P_1$, the process proceeds'to step 138. At step 138, the process enters a pressure alert operating mode, shown in FIG. 6. The pressure alert mode is a sub-routine of the main process in which selected tire condition data is broadcast in a predefined manner.

Figure 6:
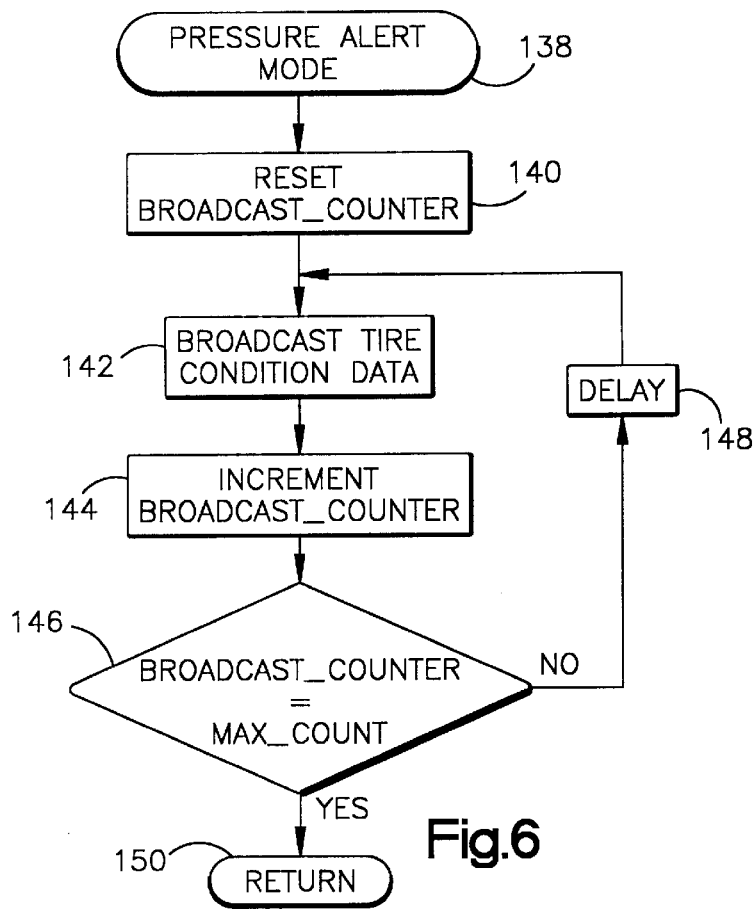
FIG. 6 is a flow diagram illustrating operation of the sensor module of FIG. 2 in a third mode.

With reference to FIG. 6, the pressure alert mode continues to step 140 in which a BROADCAST_COUNTER is reset. The BROADCAST_COUNTER defines the number of broadcasts of the tire condition data signal and/or a time period during which the tire condition data signal is broadcast. For example, the tire condition data signal is broadcast a predetermined number of times defined by the BROADCAST_COUNTER, such as about four times within about a one-minute interval.

The process proceeds to step 142 in which the tire condition data signal is broadcast, as described above. After broadcasting the tire condition data signal, the process then proceeds to step 144 in which the BROADCAST_COUNTER is incremented. As a matter of design choice, the counter also could be configured to be decremented until a predetermined minimum counter value is reached. Alternatively, the BROADCAST_COUNTER could be implemented as a timer of a predetermined duration.

From step 144, the process then proceeds to step 146 in which a determination is made as to whether the BROADCAST_COUNTER has reached a maximum count value (MAX_COUNT). If the determination in step 146 is negative, indicating that the BROADCAST_COUNTER has not reached the MAX_COUNT value, the process proceeds to step 148 in which a predetermined time delay, such as at least about 15 seconds, is imposed prior to the next broadcast of the tire condition data signal during the pressure alert mode. In this way, each broadcast in the pressure alert mode is spaced apart by a time period provided by the delay of step 148. The process then returns to step 142 for another broadcast of the tire condition data signal.

If the determination at step 146 is affirmative, thereby indicating that the BROADCAST_COUNTER has reached the MAX_COUNT value, the process proceeds to step 150. At step 150, the process returns to the operating mode that called the pressure alert subroutine. In this example, the process proceeds to step 126 of the sleep mode (FIG. 4) to determine whether the SLEEP_SENSING_TIMER has expired.

Figure 5:
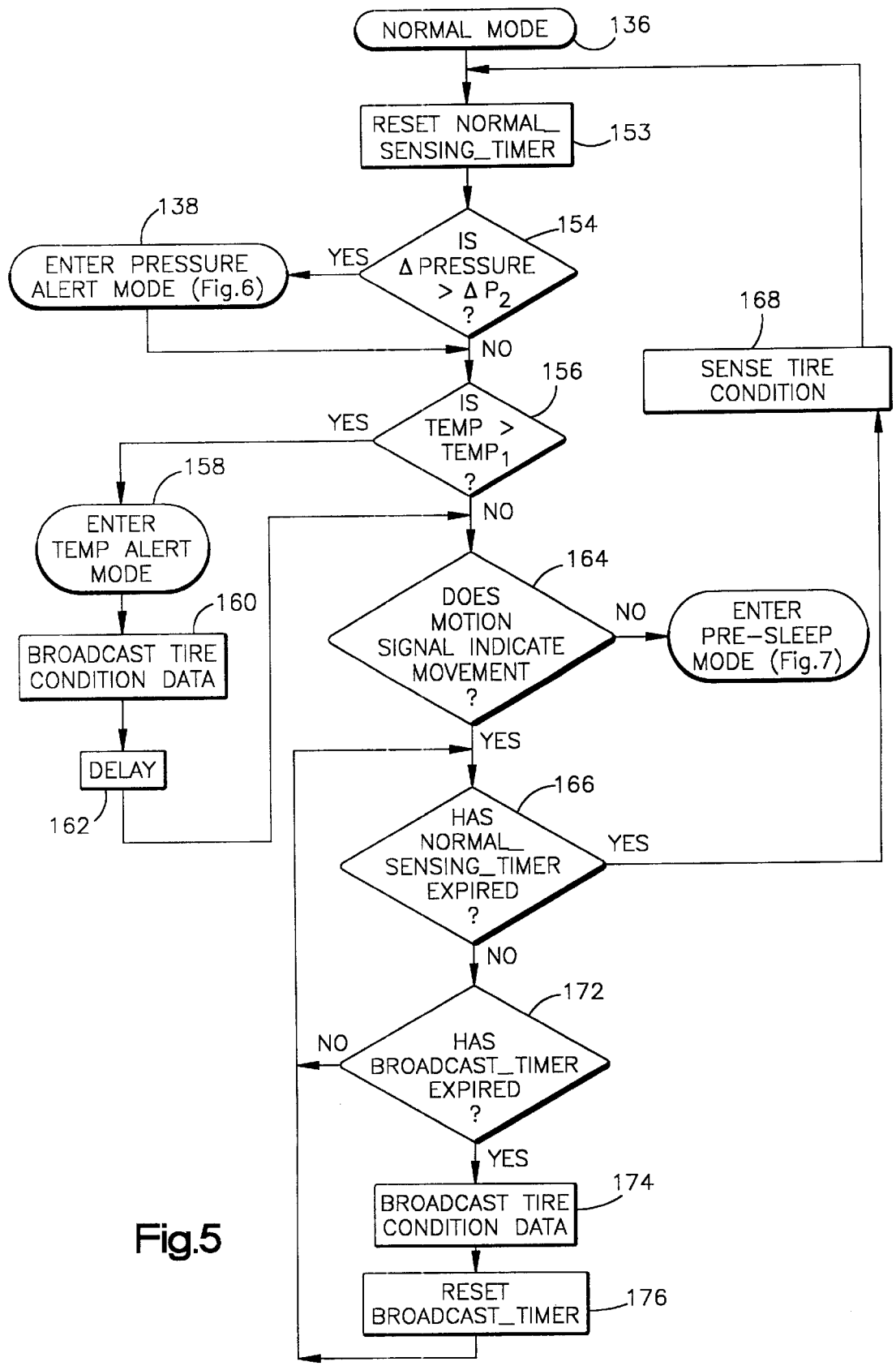
FIG. 5 is a flow diagram illustrating operation of the sensor module of FIG. 2 in a second mode.

FIG. 5 illustrates operating characteristics of the module 14 for the normal operating mode. As mentioned above, the normal operating mode is active when the vehicle is moving above the predetermined threshold speed, e.g. 10-MPH. The normal operating mode begins at step 136. Typically, before entering the normal operating mode, the tire condition data is broadcast (step 178, 132) and the BROADCAST_TIMER is reset (step 180, 134). Such steps, alternatively, may be performed contemporaneously with or after entering the normal operating mode.

The process proceeds to step 153 in which a NORMAL_SENSING_TIMER is reset. The NORMAL_SENSING_TIMER is implemented within the controller 72 as a timer of a predetermined duration. The controller 72 controls activation of the tire condition sensors 78, 84, and 88 during the normal operating mode in response to expiration of this timer. Timer expiration occurs when the timer counts down from some initial value to zero.

After resetting the NORMAL_SENSING_TIMER, the process proceeds to step 154. At step 154, a determination is made as to whether a change in the sensed tire pressure, indicated at ΔPRESSURE, is greater than a predetermined pressure threshold $\Delta AP_2$, such as about 15 kPa or 2 psi. In particular, ΔPRESSURE is defined by:

$$\Delta\text{Pressure} = |\text{PRESSURE}_t - \text{PRESSURE}_{t-1}|$$

where $\text{PRESSURE}_t$ is the current measurement of the sensed tire pressure and $\text{PRESSURE}_{t-1}$ is a reference value equal to the last tire pressure measurement that was broadcast in the tire condition data signal. The $\text{PRESSURE}_{t-1}$ value is stored in appropriate memory of the controller 72 after each broadcast. Accordingly, with each broadcast of the tire condition data signal, the reference value $\text{PRESSURE}_{t-1}$ is replaced by the pressure value being broadcast.

If it is determined that the ΔPRESSURE is greater than the threshold $\Delta P_2$, the process proceeds to step 138 in which the process enters the pressure alert mode of FIG. 6. The pressure alert mode is entered, for example, after the controller 72 determines at least about a 15–20 kPa (or 2–3 PSI) difference between the current pressure measurement $\text{PRESSURE}_t$ and the reference pressure measurement $\text{PRESSURE}_{t-1}$. Alternatively, as mentioned above, the controller might enter the pressure alert mode upon determining that the sensed pressure has a predetermined relationship relative to a pressure threshold.

The pressure alert mode is identical to that described above with respect to the sleep mode (FIG. 4), except that, after broadcasting the tire condition data signal the maximum number of times (e.g., four), the process returns to the normal operating mode (FIG. 5). That is, the return step 150 of the pressure alert mode (FIG. 6) returns the process to step 156 of the normal operating mode.

When the determination of step 154 is negative, thereby indicating that the ΔPRESSURE is not greater than the threshold $\Delta P_2$, the process also proceeds to step 156. At step 156, the controller 72 determines whether the calibrated value of the sensed temperature (TEMP) is greater than a temperature threshold ($\text{TEMP}_1$), such as about 80° C. If the determination of step 156 is affirmative, thereby indicating that the sensed temperature TEMP is greater than the temperature threshold $\text{Temp}_1$, the process proceeds to step 158. At step 158, a temperature alert mode or subroutine is entered.

For purposes of brevity, the temperature alert mode has been included as part of FIG. 5. The temperature alert mode advances to step 160 in which the tire condition data signal is broadcast. Preferably, a predetermined number of broadcasts are executed while in the temperature alert mode, similar to the number of broadcasts while in-the pressure alert mode of FIG. 6. After the predetermined number of broadcasts of the tire condition data have been executed (step 160), the process proceeds to step 162 in which a predetermined time delay is imposed. This time delay preferably prevents only re-entering the temperature alert mode (step 158) for a duration of time at least equal to the length of the delay. Accordingly, other operational features of the module still continue while this delay (step 162) is being executed.

The process proceeds to step 164 of the normal operating mode while the delay (step 162) is applied for the temperature alert mode. In addition, if the determination of step 156 is negative, thereby indicating that the calibrated value of the sensed temperature TEMP is not greater than the temperature threshold $\text{TEMP}_1$, the process also proceeds to step 164.

Figure 7:
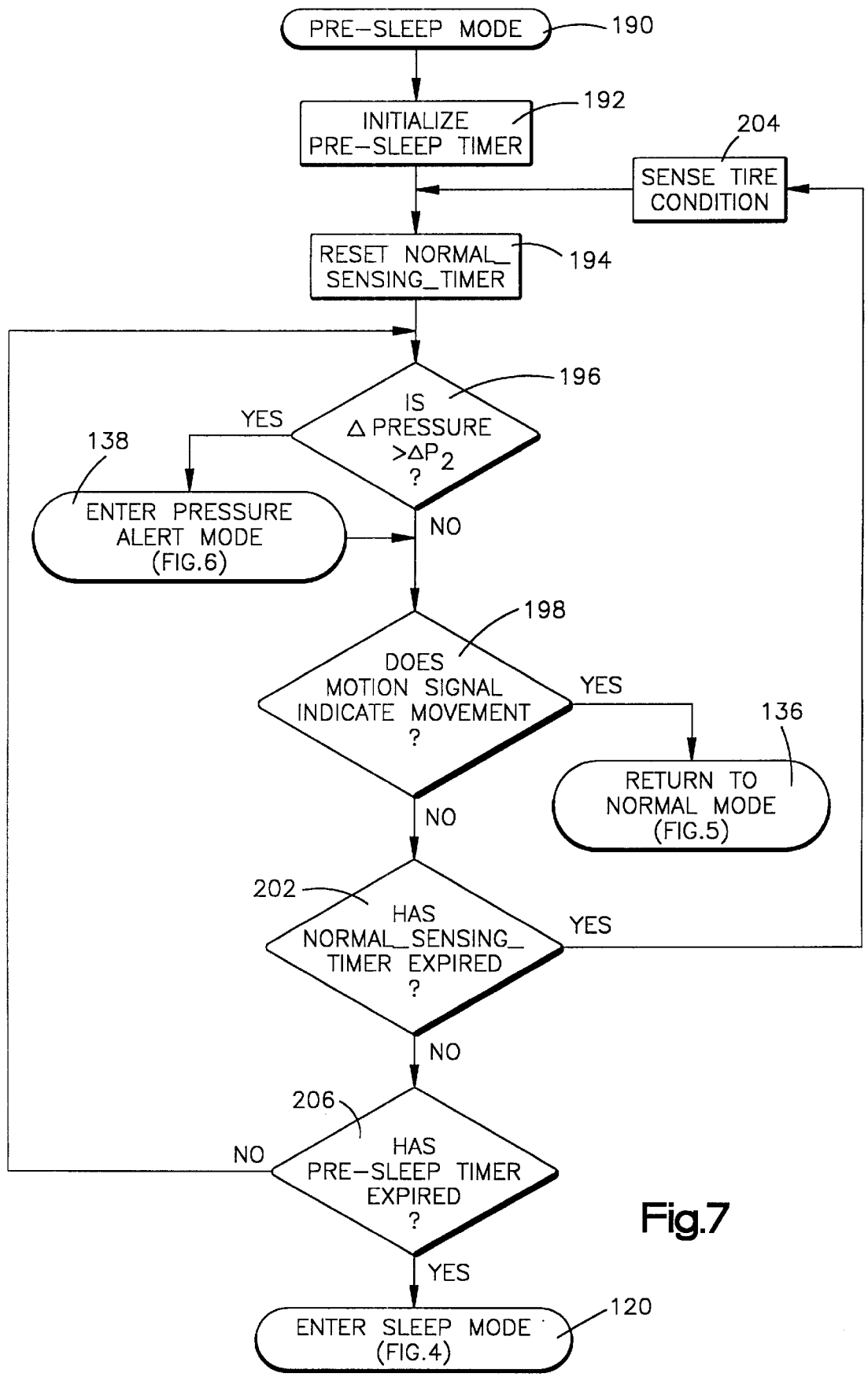
FIG. 7 is a flow diagram illustrating operation of the sensor module of FIG. 2 in a fourth mode.

At step 164, the controller 72 determines whether the motion signal indicates vehicle movement at or above a predetermined vehicle speed. If the determination of step 164 is negative, thereby indicating that the vehicle is not moving at a speed greater than the predetermined vehicle speed, the process proceeds to step 190. At step 190, the process enters a temporary pre-sleep mode, which is shown in FIG. 7.

If the determination at step 164 is affirmative, indicating that the vehicle remains moving at or above the predetermined vehicle speed, the process proceeds to step 166. At step 166, a determination is made as to whether the NORMAL_SENSING_TIMER has expired. When the NORMAL_SENSING_TIMER expires, for example, the controller 72 controls the control switch(es) 76 to provide electrical power to the sensors 78, 84, and 88 to measure corresponding tire condition and diagnostic parameters.

If the determination of step 166 is affirmative, indicating expiration of the NORMAL_SENSING_TIMER, the process proceeds to step 168. At step 168, tire condition parameters are sensed, including the tire pressure, temperature and/or battery voltage, as described above. The process then returns to step 153 in which the sensing NORMAL_SENSING_TIMER is reset. Thus, each time the sensing NORMAL_SENSING_TIMER expires, the controller 72 controls the sensors 78, 84, and 88 to sense the tire pressure, temperature, and the battery voltage.

If the determination in step 166 is negative, indicating that the sensing NORMAL_SENSING_TIMER has not yet expired, the process proceeds to step 172. At step 172, another determination is made as to whether the BROADCAST_TIMER has expired. In the event that the BROADCAST_TIMER has not expired, the process returns to step 166. If the BROADCAST_TIMER has expired, the process proceeds to step 174.

At step 174, the tire condition data signal is broadcast, such as stated above. The process then proceeds to step 176 in which the BROADCAST_TIMER is reset. Preferably, the BROADCAST_TIMER is reset to a value corresponding to a random amount of time within a variable window, such as between about three and seven minutes. This enables the transmitter 44 to intermittently broadcast the tire condition data signals at random time intervals during the normal operating mode. Accordingly, when in the normal operating mode, the tire pressure sensing module 14 effects broadcast of the tire condition data signal each time the BROADCAST_TIMER expires, unless the process enters a different operating mode prior to expiration of the BROADCAST_TIMER. After resetting the BROADCAST_TIMER (step 176), the process returns to step 166.

FIG. 7 illustrates operation of the tire condition module in the pre-sleep mode. The process begins at step 190 in which the pre-sleep mode is entered. As mentioned above, the pre-sleep mode is entered from the normal mode (FIG. 5) upon determining from the motion signal a change in vehicle movement from a value greater than a predetermined threshold (e.g., about 10 miles per hour) to an amount less than such threshold. In the exemplary embodiment described above with respect to FIG. 2, this is accomplished by the centrifugal switch being in an open condition for a predetermined time period, such as for about 5–10 seconds. This time period accounts for any switch bounce.

From step 190, the process proceeds to step 192 in which a pre-sleep timer is initialized. The pre-sleep timer provides an indication of the duration that the controller is in the pre-sleep mode. The pre-sleep timer, for example, is a counter that is incremented every measurement interval. The measurement interval is maintained substantially constant, such as based on the NORMAL_SENSING_TIMER described above. In this way, the counter provides a relatively accurate representation of the time the controller operates in the pre-sleep mode. The process then proceeds to step 194.

At step 194, the NORMAL_SENSING_TIMER is reset. The NORMAL_SENSING_TIMER is substantially identical to that described above with respect to the normal mode of FIG. 5. Briefly stated, the normal sensing timer controls the frequency at which the controller activates the tire condition sensors (e.g., 78, 84, and 88 of FIG. 2). From step 194, the process proceeds to step 196.

At step 196, a determination is made as to whether the sensed tire pressure condition has changed by predetermined amount or has a predetermined relationship relative to a threshold. In this exemplary embodiment, this determination includes determining whether a change in sensed tire pressure, indicated at ΔPRESSURE, is greater than a predetermined pressure threshold, indicated at $\Delta P_2$. The value of $\Delta P_2$, for example, is about 15 to 20 kPa (e.g., about 2 to 3 psi). If this determination is affirmative, the process proceeds to step 138 in which the controller enters the pressure alert mode of FIG. 6. After completing the steps shown in FIG. 6, the process then proceeds to step 198 of FIG. 7. If the determination at step 196 is negative, the process also proceeds to step 198.

At step 198, another determination is made as to whether the motion signal indicates at least a predetermined amount of tire movement. This is accomplished, for example, by monitoring the motion detector of the tire condition module, to determine whether the associated vehicle tire is moving at or above a predetermined vehicle speed, such as about 10 mph as sensed by switch 32. If the determination at step 198 is affirmative, indicating tire movement above some threshold, the process proceeds to step 136 in which the controller returns back to the normal operating mode of FIG. 5. Accordingly, the controller only remains in the pre-sleep mode provided that the motion signal indicates less than a predetermined amount of tire movement. Similarly, the controller operates in the normal mode if the motion signal indicates more than the predetermined amount of tire movement.

If the determination at step 198 is negative, the process proceeds to step 202. At step 202, another determination is made as to whether the NORMAL_SENSING-TIMER has expired. As mentioned above, the NORMAL_SENSING_TIMER controls the measurement interval in the pre-sleep mode as well as in the normal mode. Accordingly, the tire conditions are sensed at substantially the same rate, which may be random within predetermined time periods, while the controller operates in the normal mode and the pre-sleep mode. The measurement interval in both these modes, for example, ranges from about every five to ten seconds.

In the event that the NORMAL_SENSING_TIMER has expired, the process proceeds to step 204 in which the tire condition is sensed. With reference to FIG. 2, this may include the controller 72 controlling a switch(es) 76 to activate one or more of the tire condition sensors 78, 84, and 88. The signals indicative of the sensed tire conditions are provided to the controller 72. Referring back to FIG. 7, from step 204, the process returns to step 194 in which the NORMAL_SENSING_TIMER is reset.

If the determination at step 202 is negative, indicating that the NORMAL_SENSING_TIMER has not yet expired, the process proceeds to step 206. At step 206, a determination is made as to whether the pre-sleep timer has expired. The pre-sleep timer expires after a predetermined time period, such as ranging from about 15 to about 25 minutes.

In the event that the determination at step 206 is negative, thereby indicating that the pre-sleep timer has not expired, the process returns to step 196. If the pre-sleep timer has expired, the process proceeds to step 120, in which the controller enters the sleep mode of FIG. 4.

By way of example, the pre-sleep timer may be implemented as a counter that is incremented every measurement interval, such as upon resetting the NORMAL_SENSING_TIMER (step 194). Because, while in the pre-sleep and in the normal mode, tire condition measurements are taken at an average of about every 7 seconds, the counter may have a maximum value of about 180. The maximum counter value is selected to provide a desired time period (e.g., about 15 to 25 minutes) during which the controller can continually operate in the pre-sleep mode.

As mentioned above, the time in the pre-sleep mode period provides a transition mode between the normal mode and the sleep mode. In the pre-sleep mode, one or more selected tire conditions are sensed at substantially the same rate as when in the normal mode. The rate of tire condition sensing in the pre-sleep mode also is much greater than when in the sleep mode.

In the pre-sleep mode, however, the transmitter only transmits the tire condition data signal in response to detecting a predetermined change in the tire condition, such as a change in pressure relative to reference tire condition. The reference tire condition, for example, is based on sensed tire pressure that was transmitted by the transmitter in a previous transmission. Alternatively, the transmission of the tire condition data might be conditioned upon the sensed tire pressure being greater than or less than a corresponding pressure threshold.

In view of the foregoing, the pre-sleep mode provides a temporary operating condition of the tire condition module. For example, this provides a window of time in which a user is able to adjust the tire pressure within each vehicle while the vehicle is stationary, such as at a service station. During this time window, the module continues to sense tire pressure at substantially the same rate as when in the normal mode. Further, by forcing at least a predetermined change in tire pressure while in the pre-sleep mode, the associated module will readily transmit a current measurement of the sensed pressure. Advantageously, this mode may be used for programming purposes of the receiver module in which each tire condition module of the vehicle would be acted on by a vehicle user. In particular, each tire condition module might be acted on in a preselected order to transmit a data message signal in response to changes in the sensed tire pressure at each associated tire.

Figure 8:
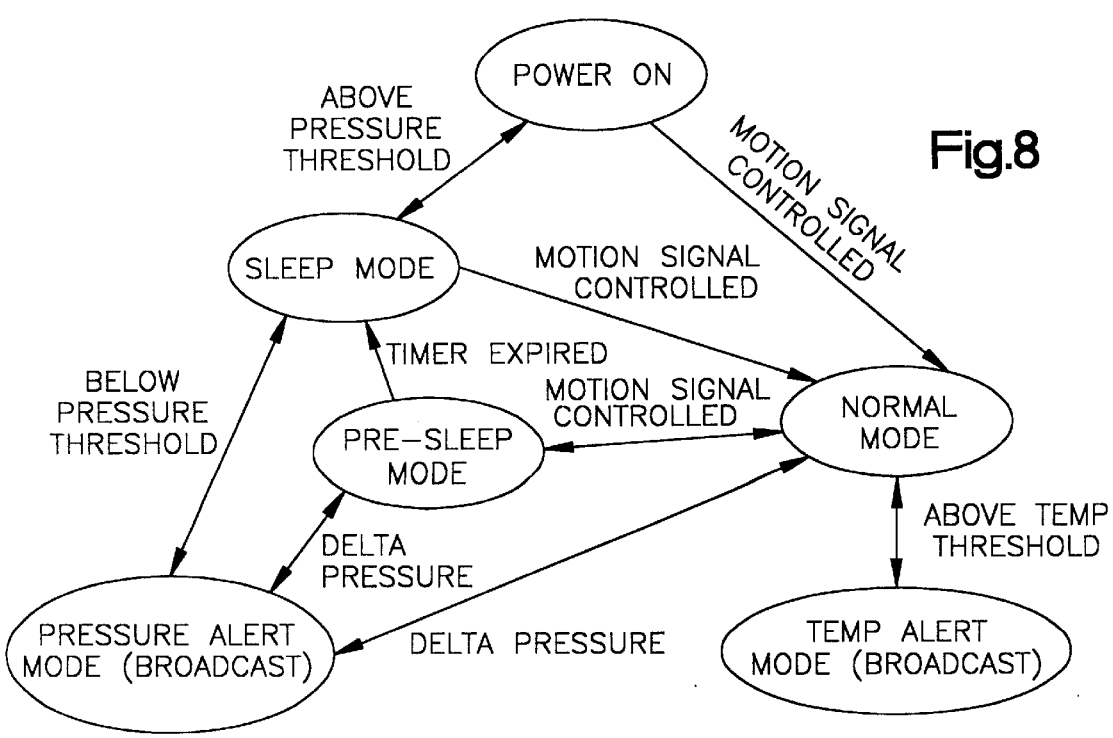
FIG. 8 is a state diagram illustrating the operation of the sensor module of FIG. 2 in accordance with the present invention.

While, for simplicity of explanation, process of FIGS. 3–7 have been described to occur as a sequence of steps, transitions between operating modes or states may occur regardless of the current function being executed within the ASIC, such as according to the state diagram of FIG. 8.

From the above description of the invention, those skilled in the art will perceive improvements, changes and modifications. Such improvements, changes and modifications within the skill of the art are intended to be covered by the appended claims.

Having described the invention, the following is claimed:

1. A tire condition sensor module for a vehicle comprising:
    a tire condition sensor operative to sense a tire condition of a vehicle tire and provide a tire condition signal indicative thereof;
    a motion detector operative to detect movement of the associated vehicle tire and to provide a motion signal indicating movement of the vehicle tire;
    a transmitter operative to transmit a tire transmitter signal having a characteristic based on the tire condition signal; and
    a controller connected with said motion detector, said transmitter, and said tire condition sensor, said controller controlling said tire condition sensor to sense the tire condition at a first sensing rate during an initial time period in which said motion signal indicates less than a predetermined amount tire movement and controlling said transmitter during the initial time period to transmit said tire transmitter signal depending on the sensed tire condition, said controller controlling said tire condition sensor after the initial time period to sense at a second sensing rate, which is less than the first sensing rate, so long as the motion signal continues to indicate less than the predetermined amount of tire movement.

2. A module as set forth in claim 1 wherein said controller operates in a first operating mode in response to said motion signal indicating at least the predetermined amount of tire movement, said controller, when operating in the first operating mode, controlling said tire condition module to sense at a third sensing rate that is greater than the second sensing rate.

3. A module as set forth in claim 2 wherein the first and third sensing rates are about equal.

4. A module as set forth in claim 2 wherein said controller operates in a second operating mode during the initial time period and in a third operating mode after the predetermined time period so long as said motion signal continues to indicate less than the first amount of tire movement, said controller controlling said transmitter to transmit a tire transmitter signal in each of said second and third operating modes in response to determining the sensed tire condition has the preselected relationship relative to a tire condition threshold.

5. A module as set forth in claim 4 wherein, when in said second operating mode, said controller controls said transmitter to transmit said tire transmitter signal in response to determining at least a predetermined change between the sensed tire condition and a reference tire condition.

6. A module as set forth in claim 5 wherein the reference tire condition corresponds to a sensed tire condition that was indicated in a previously transmitted tire transmitter signal.

7. A module as set forth in claim 1 wherein the sensed tire condition is tire pressure and said tire condition signal has a characteristic indicative of the sensed tire pressure.

8. A tire condition sensor module for a vehicle tire comprising:
    a tire condition sensor operative to sense a tire condition of an associated vehicle tire and provide a tire condition signal having a characteristic indicative thereof;
    a motion detector operative to detect movement of the associated vehicle tire and provide a motion signal indicative thereof;
    a transmitter operative to transmit a tire transmitter signal having a characteristic based on the tire condition signal; and
    a controller connected with said motion detector, said transmitter, and said tire condition sensor, said controller having a normal mode in response to the motion signal indicating at least a first amount of tire movement, said controller having a temporary transition mode in response to determining from the motion signal a change in tire movement from at least the first amount of tire movement to an amount less than the first amount of tire movement, said controller having a sleep mode that occurs after said transition mode so long as said motion signal continues to indicate less than the first amount of tire movement for a time period, said controller controlling said tire condition sensor and said tire transmitter differently in each mode.

9. A module as set forth in claim 8 wherein said controller, when in said transition mode, includes means for controlling said transmitter to transmit the tire transmitter signal in response to said controller determining that the tire condition signal indicates a sensed tire condition that has a predetermined relationship relative to a tire condition threshold.

10. A module as set forth in claim 9 wherein said controller, when in said transition mode, controls said tire condition sensor to sense tire condition at a first rate that is about the same rate as when said controller is in said normal mode, said controller controlling said tire condition sensor to sense tire condition intermittently when said controller is in said sleep mode at a second rate which is less than the first rate.

11. A module as set forth in claim 10 wherein the first rate is a random rate which ranges from a third rate to a fourth rate, the second rate being less than the third rate.

12. A module as set forth in claim 8 wherein said controller, when in said sleep and transition modes, controls said transmitter to effect transmission of said tire transmitter signal in response to determining at least a predetermined change between the sensed tire condition and a reference tire condition.

13. A module as set forth in claim 12 wherein the reference tire condition has a value that corresponds to a sensed tire condition that was indicated in a previously transmitted tire transmitter signal.

14. A tire condition sensor module for a vehicle tire comprising:
   a tire condition sensor operative to sense a tire condition of an associated vehicle tire and provide a tire condition signal having a characteristic indicative thereof;
   a motion detector operative to detect movement of the associated vehicle tire and provide a motion signal indicating movement of the associated vehicle tire;
   a transmitter operative to transmit a tire transmitter signal having a characteristic based on the tire condition signal; and
   a controller connected with said motion detector, said transmitter, and said tire condition sensor, said controller transitioning from a first operating mode to a temporary second operating mode in response to determining from said motion signal a change in tire movement from a first amount of tire movement to an amount that is less than the first amount of tire movement, said controller operating in third operating mode after said second operating mode so long as said motion signal continues to indicate an amount of tire movement that is less than the first amount, said controller, when in the first and second operating modes, controlling said tire condition sensor to sense tire condition at a rate that is greater than when in the third operating mode.

15. A tire condition module as set forth in claim 14 wherein said controller, when in said second operating mode, controls said transmitter to transmit in response to determining that the sensed tire condition has a preselected relationship relative to a tire condition threshold.

16. A tire condition module as set forth in claim 14 wherein said controller, when in said second operating mode, controls transmitter to transmit in response to determining at least a predetermined change between the sensed tire condition and a reference tire condition that was indicated in a previously transmitted tire transmitter signal.

17. A tire condition sensor module for a vehicle comprising:
   means for sensing a tire condition of an associated vehicle tire and providing a tire condition signal having a characteristic indicative thereof;
   means for sensing movement of the associated vehicle tire and to providing a motion signal having a characteristic indicating movement of the associated vehicle tire;
   means for transmitting a tire transmitter signal having a characteristic based on the sensed tire condition; and
   control means for controlling said tire condition sensing means and said tire transmitting means in response to said motion signal, said control means operating in a normal mode in response to said motion signal indicating at least a first amount of tire movement, said control means operating in a temporary transition mode in response to determining a change in tire movement from at least the first amount of tire movement to an amount less than the first amount of tire movement, said control means also operating in a sleep mode after said transition mode so long as said motion signal continues to indicate less than the first amount of tire movement for a time period, said control means, when in the normal and transition modes, controlling said sensing means to sense at a rate that is greater than when in the sleep mode.

18. In a tire condition module which is mountable at a vehicle tire, a method of controlling operation of the tire condition module comprising the steps of:
   sensing movement of a vehicle tire;
   providing a signal based on the sensed tire movement;
   operating in a first mode while the signal indicates at least a first amount of tire movement;
   changing from the first mode to a second mode in response to the signal indicating that the tire movement has changed from at least the first amount to an amount less than the first amount;
   operating in the second mode during an initial time period when the signal indicates less than the first amount of tire movement;
   changing from the second mode to a third mode after the predetermined time period provided that the signal indicates less than the first amount of tire movement;
   operating in the third mode so long as the signal continues to indicate less than the first amount of tire movement; and
   sensing tire condition at a greater rate when in the first and second modes than when in the third mode.

19. A method as set forth in claim 18 further including transmitting a tire transmitter signal indicative of the sensed tire condition depending on the sensed tire condition.

20. A method as set forth in claim 19 wherein, when in the second mode, the tire transmitter signal is transmitted in response to determining at least a predetermined change between the sensed tire condition and a reference tire condition.

21. A method as set forth in claim 19 wherein, when in the second mode, transmitting the tire transmitter signal in response to determining that the sensed tire condition has a predetermined relationship relative to a tire condition threshold.

* * * * *